United States Patent [19]
Miyazaki

[11] Patent Number: 5,714,841
[45] Date of Patent: Feb. 3, 1998

[54] PLASMA-ADDRESSED ELECTRO-OPTICAL DISPLAY WITH EMBEDDED ELECTRODES

[75] Inventor: Shigeki Miyazaki, Kanagawa, Japan

[73] Assignee: Sony Corporation, Tokyo, Japan

[21] Appl. No.: 644,955

[22] Filed: May 13, 1996

[30] Foreign Application Priority Data

May 12, 1995 [JP] Japan .................. 7-166767

[51] Int. Cl.$^6$ .................................................. H01J 19/24
[52] U.S. Cl. .................. 313/585; 349/32; 445/24
[58] Field of Search ........................ 313/582, 584,
313/585, 586, 495, 485, 486; 349/32; 315/169.4;
445/24, 25

[56] References Cited

U.S. PATENT DOCUMENTS

| | | | |
|---|---|---|---|
| 3,942,061 | 3/1976 | van Esdonk et al. | 313/584 |
| 4,270,823 | 6/1981 | Kuznetoff | 445/24 |
| 4,389,276 | 6/1983 | de Vries | 445/24 |
| 5,077,553 | 12/1991 | Buzak | 340/794 |
| 5,164,633 | 11/1992 | Kim et al. | 313/584 |
| 5,244,427 | 9/1993 | Umeya | 345/60 |
| 5,408,245 | 4/1995 | Kakizaki | 445/24 |
| 5,495,142 | 2/1996 | Hayashi | 313/584 |
| 5,525,862 | 6/1996 | Miyazaki | 313/582 |

*Primary Examiner*—Michael Horabik
*Assistant Examiner*—Michael Day
*Attorney, Agent, or Firm*—Hill, Steadman & Simpson

[57] ABSTRACT

To improve the durability of discharge electrodes formed in a plasma cell and achieve fine detail, a plasma-addressed display device is provided having a laminated structure with a display cell 1 provided with column-arranged, stripe-shaped signal electrodes 5, a plasma cell 2 provided with row-arranged, stripe-shaped discharge electrodes 9, and a dielectric sheet 3 sandwiched in between the display cell 1 and the plasma cell 2. The portions where the signal electrodes 5 and the discharge electrodes 9 intersect define pixels. The plasma cell 2 includes an insulating substrate 8 bonded to the dielectric sheet 3 with a gap therebetween to form a cell and a gas that ionizes when a voltage is applied to the discharge electrodes 9 sealed in the cell. The discharge electrodes 9 are constituted by electrically conductive material embedded into grooves 13 dug in rows into the insulating substrate 8.

5 Claims, 5 Drawing Sheets

PLASMA-ADDRESSED ELECTRO-OPTICAL DISPLAY WITH EMBEDDED ELECTRODES

BACKGROUND OF THE INVENTION

1. Field of the Invention

The present invention relates to plasma-addressed display panels having a laminated structure where a display cell and a plasma cell are overlaid, and more particularly to the structure of discharge electrodes formed in the plasma cell and a manufacturing the same.

2. Description of the Related Art

Plasma-addressed display panels where a plasma cell is used as a display cell addressing are well known and are disclosed, for example, in Japanese Laid-open Patent Application No. Hei. 4-265931 and U.S. Pat. No. 5,525,862. As shown in FIG. 5, this plasma-addressed display panel has a laminated structure including a display cell 1 and a plasma cell 2 interposed by a dielectric sheet 3. The plasma cell 2 includes an insulating substrate 8 bonded with a gap therebetween onto the lower side of the dielectric sheet 3 to form a cell, with an ionizable gas being sealed within the cell. Stripe-shaped (row-shaped) discharge electrodes 9 are formed at the inner surface of the insulating substrate 8 of glass, etc. The discharge electrodes 9 are printed on the flat insulating substrate using screen-printing techniques, etc. and then are sintered, so as to give superior productivity and ease of manufacture. Spacing walls 10 are formed so as to divide the cell to form discharge channels 12 each including a pair of discharge electrodes 9, with ionizable gas then being sealed within the discharge channels 12. The spacing walls 10 can be formed using screen printing techniques, etc., with the tip end part coming into contact with the lower surface side of the dielectric sheet 3. The pair of discharge electrodes 9 encompassed by adjacent spacing walls 10 function as an anode A and a cathode K, between which a plasma discharge is generated. The dielectric sheet 3 and the insulating substrate 8 are bonded together via a glass frit 11.

On the other side, the display cell 1 is constituted by an upper side transparent substrate 4. This transparent substrate 4 made of glass or the like is bonded to the dielectric sheet 3 with a prescribed gap therebetween using sealing members, etc. to form a cell. The cell is then filled with an electro-optical substance such as liquid crystal 7. Signal electrodes 5 are formed as stripes in a column direction at the inner surface of the transparent substrate 4. These signal electrodes 5 are orthogonal with respect to the row-shaped discharge electrodes 5. Matrix-shaped pixels are then defined at the intersecting portions of the signal electrodes 5 and the discharge channels 12.

With such a plasma-addressed display panel as constructed above, display driving is carried out by searming the row-shaped discharge channels 12 sequentially and applying an image signal to the signal electrodes 5 of the display cell 1 is synchronization with the scanning timing. When a plasma discharge occurs within the discharge channel 12, the inside of the discharge channel reaches the anode potential in an approximately uniform manner and pixel selection is carried out for each one line. i.e. the discharge channel functions as a sampling switch. When the image signal is applied to each pixel with the plasma sampling switch in a conducting state, sampling is carried out and the transmittance of the liquid crystal 7 is controlled pixel-by-pixel. The image signal is held without modification within the pixels even after the plasma sampling switch is rendered non-conductive.

In the plasma-addressed display panel shown in FIG. 5, the discharge electrodes 9 formed at the plasma cell 2 are generally formed by subjecting the insulating substrate 8 to screen-printing. That is, the discharge electrodes are produced by transferring electrically conductive material in the form of a paste, for example, onto the fiat surface of the insulating substrate 8 using a screen mask having a stripe-shaped pattern and then subjecting the material thus transferred to heating treatment. However, these kinds of primed and sintered discharge electrodes have the following problems to be solved.

Firstly, if the line width of the discharge electrodes 9 becomes 100 μm or less, patterning becomes difficult with the screen priming. The printed and sintered discharge electrodes 9 therefore should have a line width of at least 100 μm. The fine detailing and miniaturization of the pixels is therefore inhibited and it is also hard to improve the active screen surface rate. Secondly, the accuracy of the dimensions of the discharge electrodes 9 is degraded due to leftovers of excess paste, etc. upon the screen printed surface. This causes the plasma discharge characteristics of each of the discharge channels 12 to be different and the operating characteristics of the panel to be unstable. Thirdly, the thickness of the printed and sintered discharge electrodes 9 is limited to about 20 μm at the most. The electrical resistance of the discharge electrodes therefore becomes high and no uniform plasma discharge is achieved due to voltage drops in case of larger screen sizes of the panel. Fourthly, since the adherence between the discharge electrodes 9 and the insulating substrate 8 is relatively weak when the electrically conductive material printed and sintered, the electrode material is likely to be abraded from the surface. This results in degrading the reliability of the display. Fifthly, there is no neglectable difference in the thermal expansion coefficients of the insulating substrate 8 of glass, etc. and the discharge electrodes 9 of electrically conductive paste, which causes the insulating substrate 8 to bend. Sixthly, the discharge electrodes 9 are exposed from the surface of the insulating substrate 8 and therefore they are subjected to sputtering due to the plasma particles. This causes the particles composing the conductive material to be scattered as sputtered particles. If this sputtered material becomes affixed to the surface of the insulating medium 8 of glass, etc., the transmissivity of the glass deteriorates resulting in shortening the service life of the panel.

SUMMARY OF THE INVENTION

In order to resolve the problems of the aforementioned conventional technology, the following means are provided. Basically, the plasma-addressed display panel of the present invention has a laminated structure with a display cell provided with stripe-shaped signal electrodes arranged in a column direction, a plasma cell provided with stripe-shaped discharge electrodes arranged in rows, a dielectric sheet sandwiched in between the cells. The intersecting parts of the signal electrodes and the discharge electrodes define pixels. The plasma cell is constituted by an insulating substrate bonded to the dielectric sheet with a gap therebetween to form a cell and gas sealed into the cell, which is ionized by applying a voltage to the discharge electrodes. A significant feature is that the discharge electrodes are formed by electrically conductive material embedded into grooves in a row direction at the surface of the insulating substrate. The electrically conducting material may also be sunk into the surface of the insulating substrate.

According to another aspect of the present invention, a plasma-addressed display panel manufacturing method includes the following steps. First, stripe-shaped grooves are formed in rows at the surface of an insulating substrate. Next, discharge electrodes are formed by carrying out a heating process after filling the grooves with an electrically conductive material, and the electrically conductive material is then sintered. After this, a plasma cell is assembled by bonding a surface of the dielectric sheet onto the insulating substrate with a gap therebetween to form a cell and sealing ionizable gas within the cell. Finally, the display cell is assembled by bonding the transparent substrate provided previously with the stripe-shaped signal electrodes to the other surface of the dielectric sheet with a gap therebetween to form a cell, and introducing an electro-optical substance into the cells. As a result of these processes, a plasma-addressed display panel having a display cell and a plasma cell stacked to each other so as to be interposed by a dielectric sheet is completed.

According to the present invention, the discharge electrodes are embedded into grooves in rows at the surface of the insulating material. These grooves can be finely patterned using, for example, photolithography and high-precision discharge electrodes can therefore be made. Further, the thickness of the discharge electrodes can be increased to reduce the electrical resistance by setting up the groove depth in an appropriate manner. The adhesion between the discharge electrodes and the insulating substrate is made strong because the discharge electrodes are embedded in the grooves so as to give a strong discharge electrode structure. Moreover, as well as having adherence between the side wall of the groove and the electrically conducting material, warping of the insulating substrate due to differences in the thermal expansion coefficients can be reduced by having no adhesion between the lower part of the groove and the electrically conductive material. In addition, a structure that is unlikely to receive the undesired influence of the sputtering of plasma particles can be adopted by having the surface of the electrically conductive material sunken below the surface of the insulating substrate.

DETAILED DESCRIPTION OF THE PREFERRED EMBODIMENTS

Figure 1:
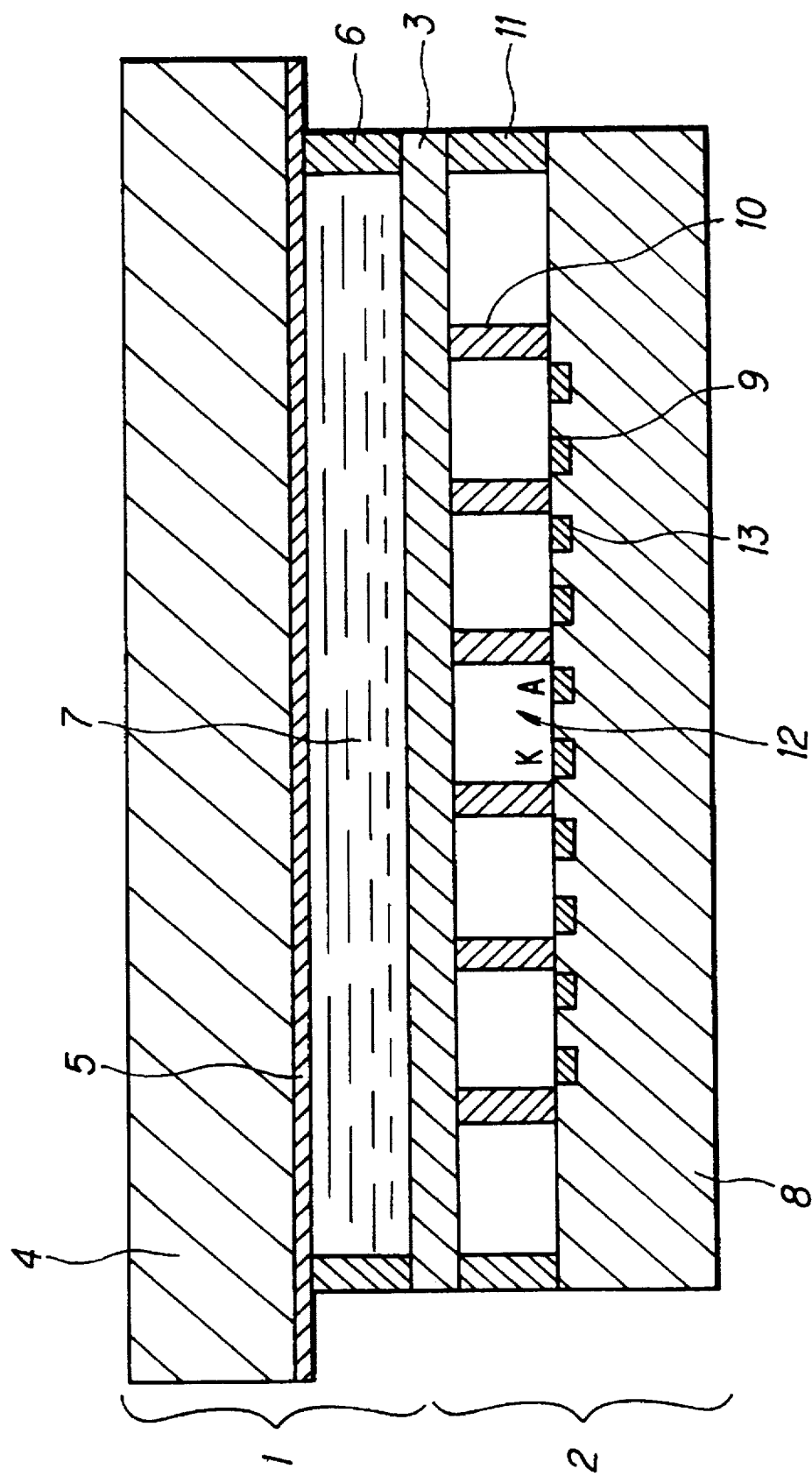
FIG. 1 is a cross-sectional view showing the whole of the first embodiment of the plasma-addressed display panel of the present invention.

A preferred embodiment of the present invention will be described with reference to the accompanying drawings in detail. FIG. 1 is a schematic cross-sectional view showing a first embodiment of a plasma-addressed display panel of the present invention. As shown in FIG. 1, this plasma-addressed display panel has a laminated structure where a dielectric sheet 3 of glass, etc. is interposed between a display cell 1 and a plasma cell 2. The display cell 1 includes an upper side transparent substrate of glass or the like, with a plurality of parallel signal electrodes 5 of transparent electrically conducting film being formed in columns at the inner surface of the transparent substrate 4. This transparent substrate 4 is adhered to the upper surface of the dielectric sheet 3 with a prescribed gap therebetween using sealing members 6 to form a cell. The cell is then filled up with an electro-optical substance such as a liquid crystal.

On the other hand, the plasma cell 2 is constituted by an insulating substrate 8 of the same glass. Discharge electrodes 9 extending in a direction that is orthogonal with respect to the direction of the signal electrodes 5 are formed at the primary inner surface of the insulating substrate 8. Each pair of these discharge electrodes 9 acts as an anode A and a cathode K that generate a plasma discharge. Barrier ribs 10 are then formed so as to block out each pair of discharge electrodes 9. The top surfaces of the barrier ribs 10 come into contact with the lower side surface of the dielectric sheet 3 so that the ribs act as spacers. The insulating substrate 8 is bonded to the lower surface of the dielectric sheet 3 using a glass flit 11 to form a cell that is sealed air-tight. Individual discharge channels 12 are formed as a result by dividing up this cell using barrier ribs 10. Each discharge channel 12 includes the pair of an anode A and a cathode K. The air-tight cell is filled up with an ionizable gas selected from, for example, helium, neon, argon, or a compound thereof.

The present invention is characterized in that the discharge electrodes 9 are electrically conducting material embedded in grooves 13 formed into the surface of the insulating substrate 8 in rows. In the embodiment shown in FIG. 1, the electrically conducting material completely fills the grooves 13 so that the surfaces of the discharge electrodes 9 are flush with the surface of the insulating substrate 8. This invention, however, is not restricted in this respect, and the surface of the discharge electrodes 9 may be sunken below the surface of the insulating substrate 8. It also becomes more difficult for the plasma particle sputtering to have any undesired influence when this sunken electrode structure is adopted.

The manufacturing method for this plasma-addressed display panel will now be described with reference to FIG. 1. First, rows of grooves 13 are formed at the surface of an insulating substrate 8. This process is carried out by either sandblasting or etching using a photoresist as a mask. Next, discharge electrodes 9 are manufactured by carrying out a heating process and a sintering process on the electrically conductive material after filling the grooves 13 with the electrically conductive material. This process may be carded out using, for example, screen printing techniques employing conductive paste or using blade techniques. In other words, a blade moved over the grooved surface pushes the conductive paste into the grooves. Further, the plasma cell 2 is assembled by bonding the lower surface of the dielectric sheet 3 onto the insulating substrate 8 with a gap therebetween to form a cell and sealing an ionizable gas into the cell. Finally, the display cell 1 is assembled by bonding the transparent substrate 4 provided with column-arranged, stripe-shaped signal electrodes 5 in advance onto the upper surface of the dielectric sheet 3 to form a cell and sealing an electro-optical substance such as a liquid crystal into the cell.

Figure 2:
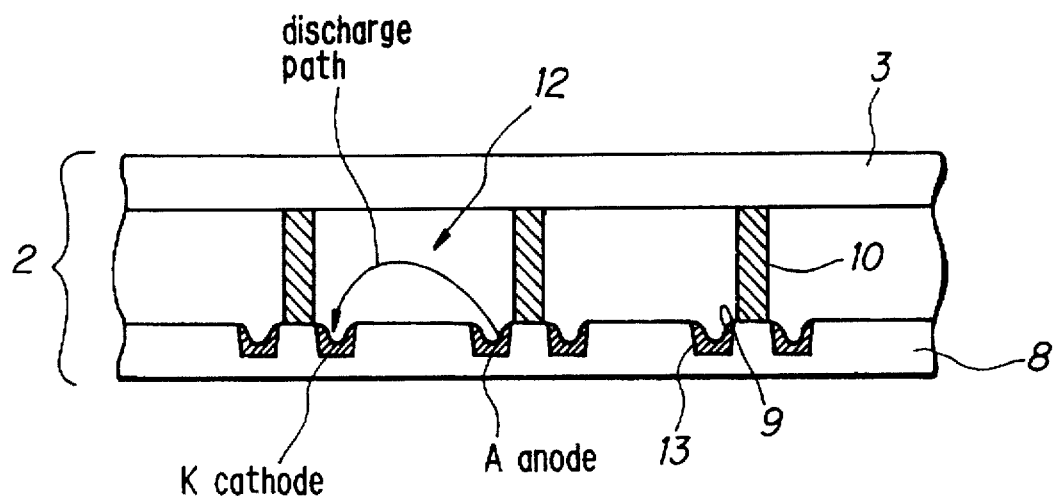
FIG. 2 is a cross-sectional view showing essential pans of the second embodiment of the plasma-addressed display panel of the present invention.

FIG. 2 is a cross-sectional view showing the essential pans of a second embodiment of the plasma-addressed display panel of the present invention. Here, only the plasma cell 2 is shown and the display cell to be overlaid thereon is omitted. The second embodiment has basically the same structure as the first embodiment, with corresponding portions bearing the corresponding reference numerals for ease of understanding. The point of difference is that the discharge electrodes 9 formed at the grooves 13 are sunken. i.e. the surface of the discharge electrodes 9 is deeper than the surface of the insulation substrate 8. In this case, the discharge paths of the discharges occurring between the cathodes K and the anodes A within the discharge channel 12 are arced or parabolic. This presents no problem with regards to the operating characteristics even if the surfaces of the discharge electrodes 9 are sunk within the grooves 13.

Figure 3:
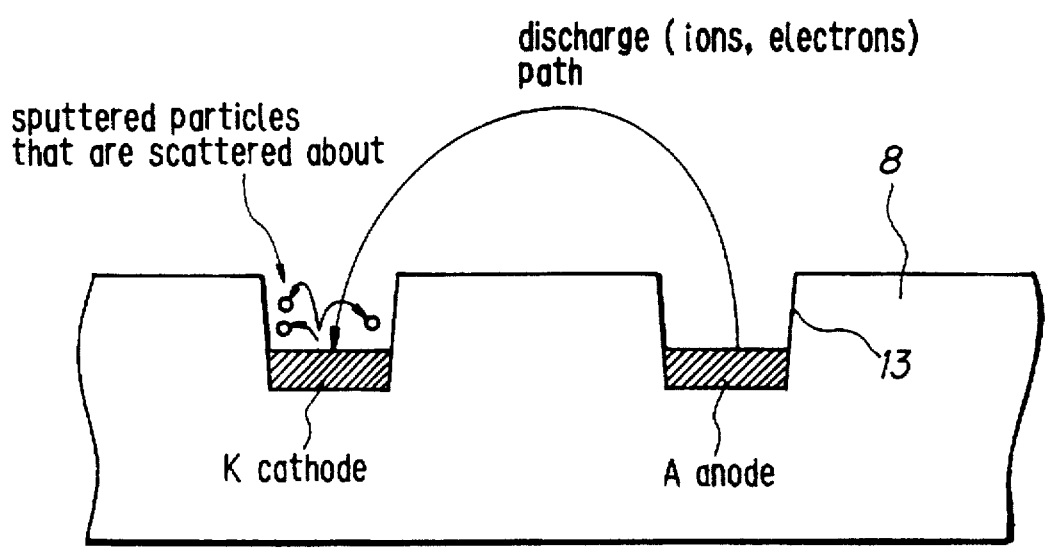
FIG. 3 is a cross-sectional view showing essential pans of the third embodiment of the plasma-addressed display panel of the present invention.

FIG. 3 is a cross-sectional view showing the essential parts of a third embodiment of the plasma-addressed display panel of the present invention. Only the insulating substrate 8 is illustrated for ease of understanding. The basic structure is the same as for the other embodiments shown in FIG. 1 and FIG. 2 and corresponding portions are given the corresponding reference numerals. The point of difference is that only the lower pan of the groove 13 is restrictedly filled with the electrically conducting material forming the discharge electrodes. This has the benefits of lessening the undesired influence of the sputtering and lengthening the service life of the panel. More specifically, the amount of the electrically conducting material sputtered that flies out of the groove 13 is small even with sputtering by ions, etc. included in the plasma particles. Accordingly, deterioration in the insulation between the anodes A and the cathodes K and the deterioration of the transmissivity of the insulating substrate 8 are suppressed thereby resulting in prolonging the service life of the panel. Plasma discharges are also possible even if the discharge electrodes are formed restricted to the bottom part of the groove 13 because the discharge paths of a medium such as the ions and the electrons are parabolic.

Figure 4:
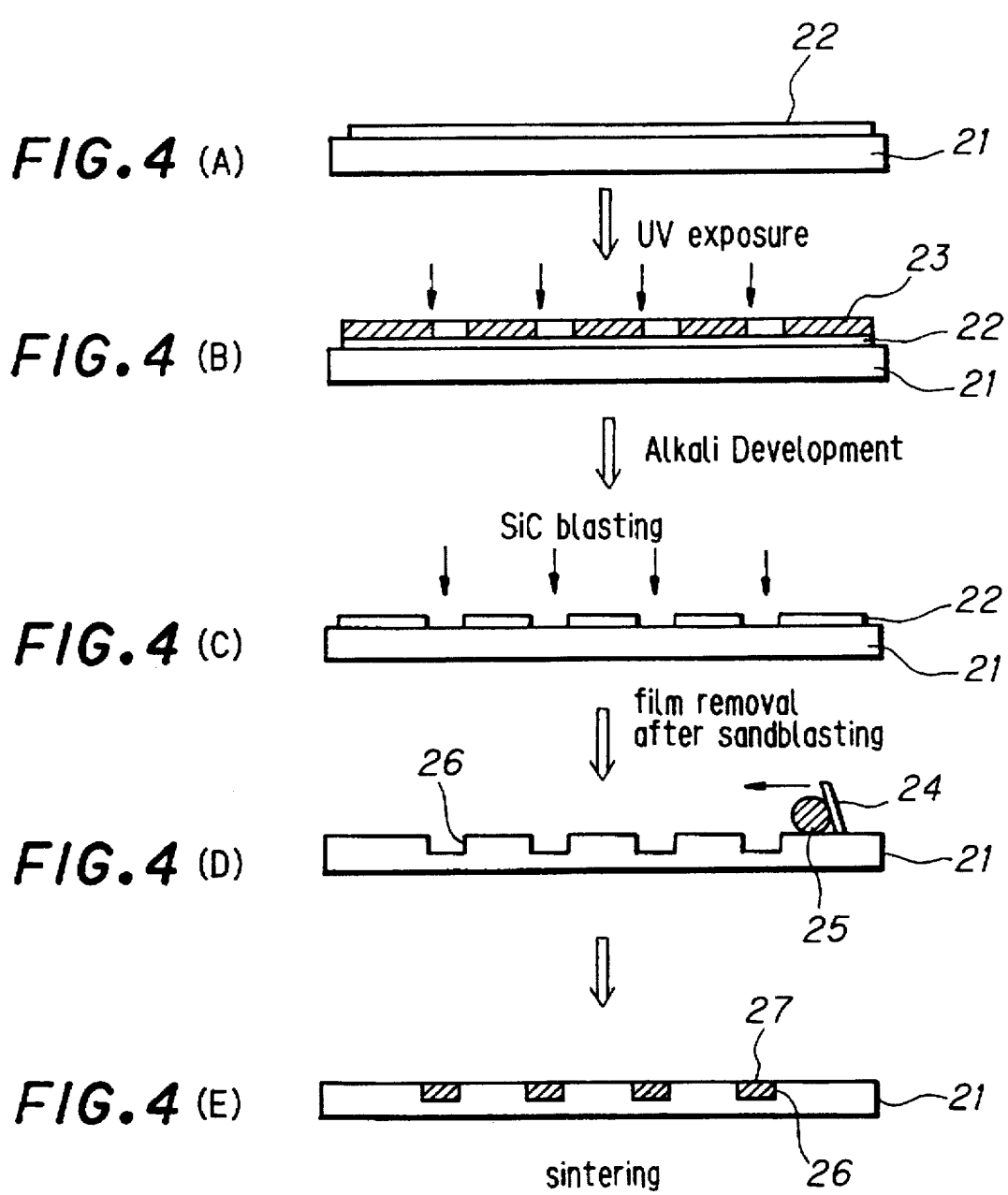
FIGS. 4(A)-4(E) are a flow diagram showing the method of manufacturing the plasma-addressed display panel of the present invention.
Figure 5:
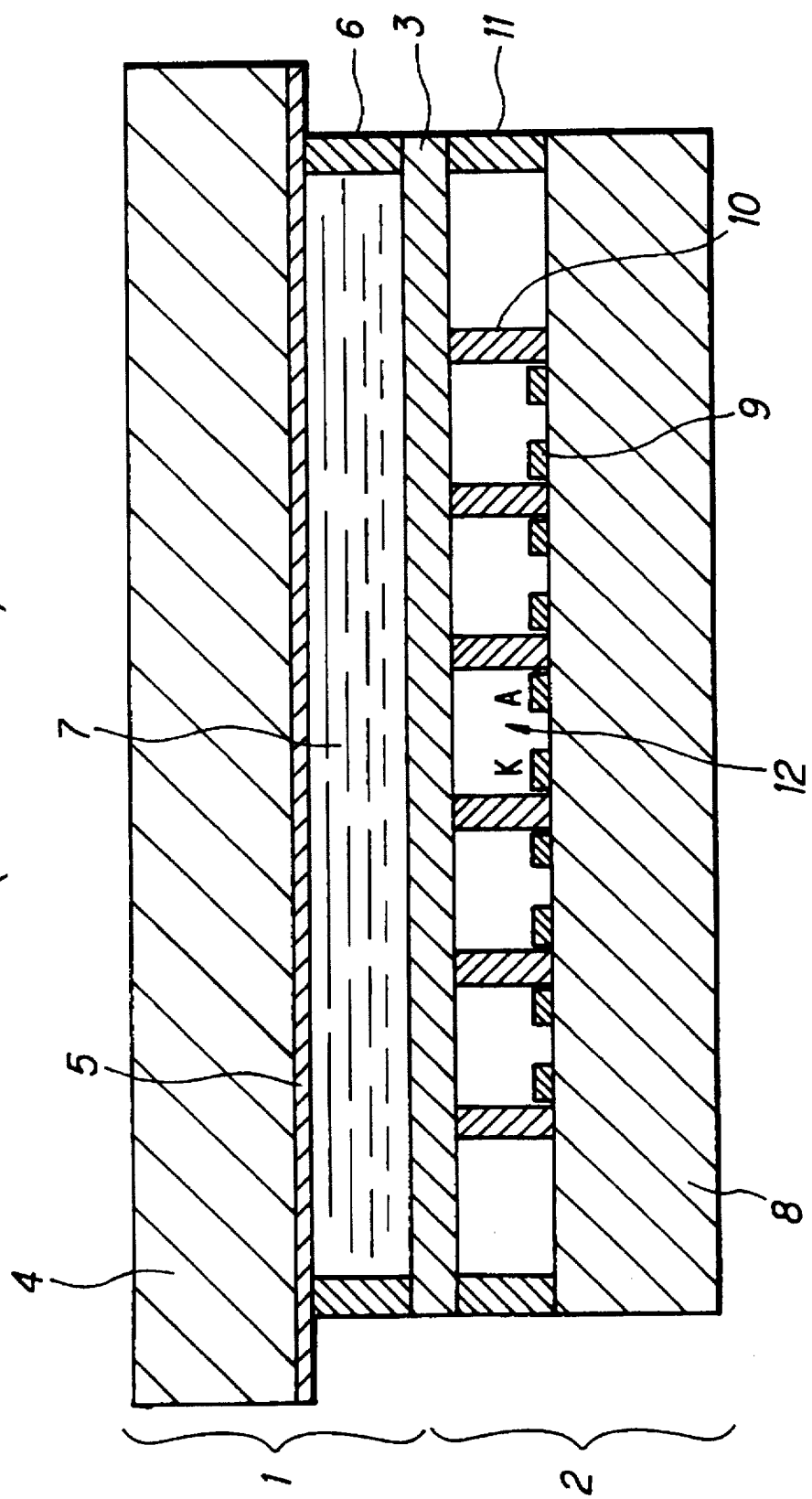
FIG. 5 is a cross-sectional view showing an example of a conventional plasma-addressed display panel.

Finally, a detailed description of the method of manufacturing the embedded discharge electrodes that are characteristic of the present invention is given with reference to FIG. 4. First, a glass substrate 21 is prepared in step (A). A photosensitive film (photoresist) 22 having a thickness of about 100 μm is coated or pasted onto the glass substrate 21. Next, the step advances to step (B) where the photosensitive film 22 is exposed to ultra-violet light (UV) using a mask 23 drawn with the desired stripe pattern. After this, the photosensitive film 22 is developed using a weak alkali solution and the unnecessary portions are removed. Then, the step advances to step (C) where grooves are formed in the glass substrate 21 by sandblasting, etc. In particular, a high-pressure jet of particles such as SiC of a particle diameter of a few μm to several tens of μm is directed to the surface of the glass substrate 21 through a patterned film 22. Unnecessary parts of the film 22 are then removed using acetone, etc. after the sandblasting. Proceeding to step (D), the paste 25 of electrically conductive material is filled into the grooves 26 using a blade 24. Screen printing techniques may also be employed in place of the method using the blade. Finally, in step (E), the discharge electrodes 27 are produced by carrying out a heating process at a temperature of about 580° C. and sintering the paste. The discharge electrode structure as shown in FIG. 1 is obtained from the above processes. The depressed or concaved type of discharge electrode structure shown in FIG. 2 and FIG. 3 can be obtained in place of the completely filled-up type of discharge electrode structure shown in FIG. 1 by selecting the paste filling-up method (blade method, screen printing method, etc.) and adjusting the paste viscosity.

The embedded discharge electrodes made using the processes shown in FIG. 4 have the following advantages. Firstly, the photolithography for the photosensitive film determines the accuracy of the patterning for the stripes. A finely detailed stripe pattern can therefore be more accurately made than when direct screen printing is applied. Secondly, a groove of a depth of greater than 100 μm can be dug using sandblasting techniques. As a result, the discharge electrodes may therefore be made thicker so that the electrical resistance thereof can be lowered. Thirdly, adherence is made strong because the discharge electrodes are embedded into the insulating substrate. Fourthly, substrate warping caused by differences in the thermal expansion coefficients of the insulating substrate and the electrically conductive material can be reduced. For example, it is preferable to have adhesive strength with respect to the bottom surface of the groove weak while maintaining adhesive strength with respect to the discharge electrodes only at the side walls of the grooves. Specifically, a friction reducing micro particle layer is formed as a foundation at the bottom of the groove before filling up with the paste.

As described above, according to the present invention, the discharge electrodes within the plasma cell are constituted by an electrically conductive paste, which are embedded into grooves dug in rows in the surface of the insulating substrate. Alternatively, this electrically conducting material is sunk down within the grooves. This kind of discharge electrode structure is obtained by filling up grooves with electrically conductive material such as a paste and then carrying out a heating process after stripe-shaped grooves have been formed at the surface of the insulating substrate using sandblasting. A finely detailed discharge electrode stripe pattern can therefore be accurately made. Further, because the film thickness of the discharge electrodes can easily be made large, the electrical resistance becomes small resulting in making the discharge characteristics stable accordingly. Discharge electrodes that are strongly adhered to the insulating substrate can be made and panel reliability can be made high. Moreover, it becomes harder for sputtering to exert any negative influence on the panel and the service life of the panel is, thus, prolonged. Warping of the insulating substrate due to differences in thermal expansion coefficients is also reduced.

Figure 6:
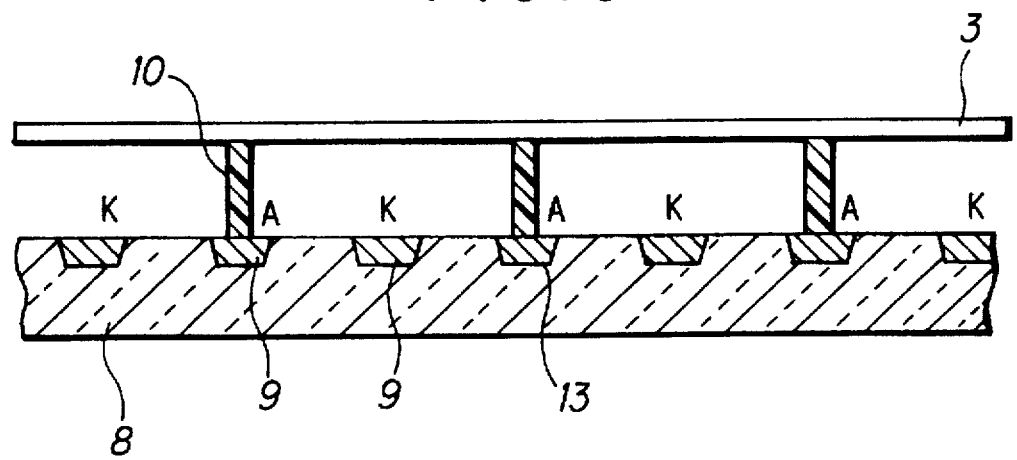
FIG. 6 is a cross sectional view of an alternate embodiment of the invention.

In FIG. 6 is an embodiment of the invention in which the electrodes 9 which include the anodes A and the cathodes K are in grooves 13, as in the previous embodiment. The barrier ribs 10 are on the anodes A and extend to the dielectric layer 3, however. The cathodes K do not have the barrier ribs formed on top. The ribs 10 are narrow enough to expose the anodes A on one, and preferably on both sides of the ribs 10, so that the anodes A are exposed to the discharge chambers.

Figure 7:
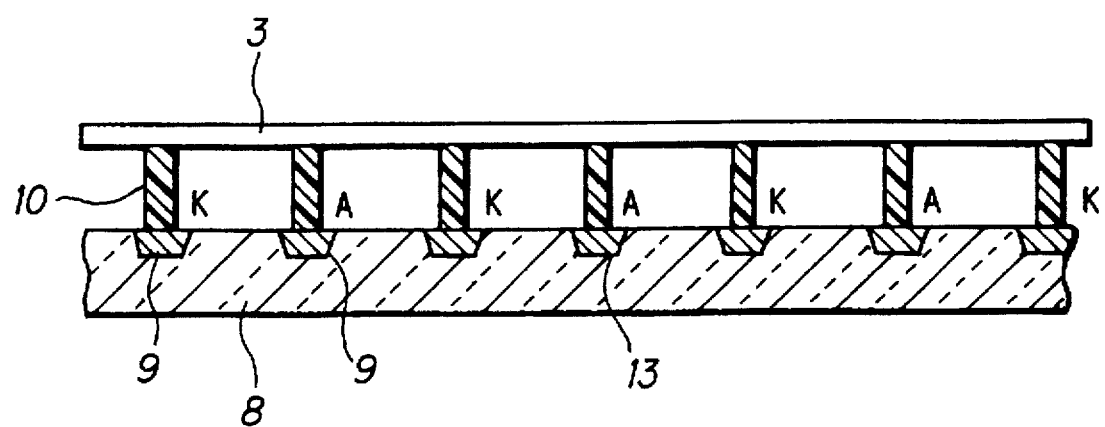
FIG. 7 is a cross-sectional view of yet a further embodiment of the invention.

A further embodiment is shown in FIG. 7, wherein the barrier ribs 10 are on both the anodes A and the cathodes K of the discharge electrodes 9. As in the embodiment of FIG. 6, the ribs 10 are narrow enough, or conversely, the electrodes are wide enough to extend from beneath the ribs 10 and be exposed to the discharge chambers.

Although other modifications and changes may be suggested by those skilled in the art, it is the intention of the inventors to embody within the patent warranted hereon all changes and modifications as reasonably and properly come within the scope of their contribution to the art.

We claim:

1. A plasma addressed electro-optical display device, comprising:
   a first substrate;

means defining a plurality of parallel grooves formed in a surface of said first substrate;

an electrically conductive material embedded in said parallel grooves for forming a plurality of first electrodes serving as anodes and cathodes, said anodes and cathodes being plasma discharge electrodes and a plasma discharge between at least two of said anodes and cathodes;

a second substrate having a plurality of second electrodes extending perpendicularly to said first electrodes, which is disposed with said second electrodes facing perpendicular to said first electrodes to define a pixel by an intersection of said first electrode and said second electrode;

a dielectric sheet provided between said first substrate and said second substrate;

a plasma cell having a plurality of plasma channels formed between said first substrate and said dielectric sheet, in which is sealed an ionizable gas; and an electro-optical material interposed between said second substrate and said plasma cell.

2. A plasma addressed electro-optical display device as claimed in claim 1, wherein a surface of said electrically conductive material is lower than that of said first substrate.

3. A plasma addressed electro-optical display device as claimed in claim 1, further comprising:

a plurality of barrier ribs formed between said first electrode and said dielectric sheet.

4. A plasma addressed electro-optical display device as claimed in claim 3, wherein said barrier ribs are formed on said anodes.

5. A plasma addressed electro-optical display device as claimed in claim 1, further comprising:

micro particles at a bottom surface of said parallel grooves beneath said electrically conductive material embedded in said parallel grooves for forming a plurality of first electrodes serving as anodes and cathodes.

* * * * *